(12) United States Patent
Gu et al.

(10) Patent No.: US 9,400,995 B2
(45) Date of Patent: *Jul. 26, 2016

(54) RECOMMENDING CONTENT INFORMATION BASED ON USER BEHAVIOR

(71) Applicant: Alibaba Group Holding Limited, George Town (KY)

(72) Inventors: Xiangyu Gu, Hangzhou (CN); Qile Fu, Hangzhou (CN); Zhonglin Zu, Hangzhou (CN); Wei Ning, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,104

(22) Filed: Aug. 15, 2014

(65) Prior Publication Data

US 2015/0026001 A1 Jan. 22, 2015

Related U.S. Application Data

(63) Continuation of application No. 13/585,552, filed on Aug. 14, 2012, now Pat. No. 8,843,484.

(30) Foreign Application Priority Data

Aug. 16, 2011 (CN) .......................... 2011 1 0235267

(51) Int. Cl.
*G06F 17/30* (2006.01)
*G06Q 30/02* (2012.01)
*G06Q 30/06* (2012.01)

(52) U.S. Cl.
CPC ...... *G06Q 30/0631* (2013.01); *G06F 17/30029* (2013.01); *G06Q 30/0201* (2013.01); *G06Q 30/0282* (2013.01)

(58) Field of Classification Search
CPC .............. G06F 17/30; G06F 17/30997; G06F 17/30867; G06Q 30/0631; G06Q 30/0282; G06Q 30/0201; H04L 67/22
See application file for complete search history.

(56) References Cited

U.S. PATENT DOCUMENTS 5,754,938 A 5/1998 Herz et al.
5,754,939 A 5/1998 Herz et al.
(Continued)

FOREIGN PATENT DOCUMENTS

CN 101079064 11/2007
CN 101334783 12/2008
(Continued)

OTHER PUBLICATIONS

Forsati et al., "Web Page Personalization Based on Weighted Association Rules", 2009 International Conference on Electronic Computer Technology, Feb. 20, 2009, pp. 130-135.
(Continued)

*Primary Examiner* — James E Richardson
(74) *Attorney, Agent, or Firm* — Van Pelt, Yi & James LLP

(57) ABSTRACT

Content recommendation includes: determining a plurality of user behavior categories pertaining to a plurality of user behaviors by a plurality of users within a period of time, and a plurality of user behavior frequencies corresponding to the plurality of user behavior categories; determining whether the number of user behavior categories exceeds a preset category threshold; in the event that the number of user behavior categories exceeds the preset threshold, excluding one or more user behavior categories such that the number of remaining user behavior categories does not exceed the preset threshold; determining, based at least on the remaining user behavior categories and corresponding user behavior frequencies, user preference data comprising frequency distribution information of a plurality of pieces of content information targeted by user behaviors in the remaining user behavior categories; and recommending content information to a user based on the user preference data.

17 Claims, 8 Drawing Sheets

(56) References Cited

U.S. PATENT DOCUMENTS

| | | |
|---|---|---|
| 5,835,087 A | 11/1998 | Herz et al. |
| 5,926,822 A * | 7/1999 | Garman ..................... 715/201 |
| 6,029,195 A | 2/2000 | Herz |
| 6,195,657 B1 | 2/2001 | Rucker et al. |
| 6,236,990 B1 | 5/2001 | Geller et al. |
| 6,606,624 B1 | 8/2003 | Goldberg |
| 7,089,237 B2 | 8/2006 | Turnbull et al. |
| 7,181,488 B2 | 2/2007 | Martin et al. |
| 7,320,020 B2 | 1/2008 | Chadwick et al. |
| 7,376,714 B1 * | 5/2008 | Gerken ..................... 709/219 |
| 7,412,202 B2 | 8/2008 | Gutta et al. |
| 7,606,772 B2 | 10/2009 | Flinn et al. |
| 7,676,400 B1 | 3/2010 | Dillon |
| 7,836,051 B1 | 11/2010 | Mason |
| 8,122,031 B1 * | 2/2012 | Mauro et al. ................. 707/748 |
| 8,270,955 B2 | 9/2012 | Ramer et al. |
| 8,271,413 B2 | 9/2012 | Agarwal et al. |
| 8,271,878 B2 | 9/2012 | Kane et al. |
| 8,301,514 B1 | 10/2012 | Vippagunta |
| 8,645,409 B1 | 2/2014 | Garg et al. |
| 8,898,283 B2 | 11/2014 | Zhang et al. |
| 2001/0049623 A1 | 12/2001 | Aggarwal et al. |
| 2003/0005113 A1 | 1/2003 | Moore |
| 2004/0044677 A1 | 3/2004 | Huper-Graff et al. |
| 2005/0096997 A1 | 5/2005 | Jain et al. |
| 2005/0222987 A1 * | 10/2005 | Vadon .............................. 707/3 |
| 2005/0289140 A1 | 12/2005 | Ford et al. |
| 2006/0041550 A1 | 2/2006 | Bennett et al. |
| 2006/0069616 A1 | 3/2006 | Bau |
| 2006/0111833 A1 | 5/2006 | Feldman et al. |
| 2006/0136589 A1 | 6/2006 | Konig et al. |
| 2006/0288038 A1 | 12/2006 | Zheng et al. |
| 2007/0061195 A1 | 3/2007 | Liu et al. |
| 2007/0100840 A1 | 5/2007 | Matsubara |
| 2007/0203589 A1 * | 8/2007 | Flinn et al. ..................... 700/29 |
| 2007/0233730 A1 | 10/2007 | Johnston |
| 2007/0239535 A1 | 10/2007 | Koran et al. |
| 2008/0004884 A1 | 1/2008 | Flake et al. |
| 2008/0033939 A1 | 2/2008 | Khandelwal |
| 2008/0120129 A1 | 5/2008 | Seubert et al. |
| 2008/0162431 A1 * | 7/2008 | Xu et al. ............................ 707/3 |
| 2008/0201311 A1 | 8/2008 | Ertugrul et al. |
| 2008/0209351 A1 * | 8/2008 | Macadaan et al. ............ 715/762 |
| 2009/0006207 A1 | 1/2009 | Datar et al. |
| 2009/0037355 A1 * | 2/2009 | Brave et al. ..................... 706/45 |
| 2009/0063284 A1 | 3/2009 | Turpin et al. |
| 2009/0083362 A1 | 3/2009 | Svendsen |
| 2009/0106221 A1 | 4/2009 | Meyerzon et al. |
| 2009/0125719 A1 * | 5/2009 | Cochran et al. ............... 713/171 |
| 2009/0240586 A1 | 9/2009 | Ramer et al. |
| 2009/0248494 A1 * | 10/2009 | Hueter et al. ................... 705/10 |
| 2009/0271800 A1 * | 10/2009 | Deshpande et al. .......... 718/107 |
| 2009/0281870 A1 | 11/2009 | Sun et al. |
| 2010/0076968 A1 * | 3/2010 | Boyns et al. .................. 707/732 |
| 2010/0082503 A1 | 4/2010 | Kantak |
| 2010/0114587 A1 | 5/2010 | Masuyama et al. |
| 2010/0153440 A1 | 6/2010 | Hubert |
| 2010/0235351 A1 | 9/2010 | Iwasa et al. |
| 2010/0262692 A1 | 10/2010 | Zhang et al. |
| 2010/0293034 A1 | 11/2010 | Olejniczak et al. |
| 2010/0293160 A1 | 11/2010 | Aravamudan et al. |
| 2010/0332304 A1 * | 12/2010 | Higgins et al. .............. 705/14.16 |
| 2011/0035379 A1 | 2/2011 | Chen et al. |
| 2011/0264736 A1 | 10/2011 | Zuckerberg et al. |
| 2012/0047148 A1 | 2/2012 | Guo et al. |
| 2012/0095837 A1 | 4/2012 | Bharat et al. |
| 2012/0233173 A1 * | 9/2012 | Yang et al. .................... 707/740 |
| 2012/0254099 A1 | 10/2012 | Flinn et al. |
| 2012/0265599 A1 | 10/2012 | Corner et al. |
| 2012/0290434 A1 | 11/2012 | Moritz et al. |
| 2012/0290950 A1 | 11/2012 | Rapaport et al. |
| 2012/0330936 A1 | 12/2012 | McCloskey et al. |
| 2013/0055145 A1 | 2/2013 | Antony et al. |
| 2013/0166488 A1 * | 6/2013 | Yang et al. ...................... 706/46 |

FOREIGN PATENT DOCUMENTS

| | | |
|---|---|---|
| CN | 101694659 | 4/2010 |
| FR | 2878670 | 6/2006 |
| JP | 2001236405 | 8/2001 |
| JP | 2001265767 | 9/2001 |
| JP | 2002007873 | 1/2002 |
| JP | 2002063303 | 2/2002 |
| JP | 2002108918 | 4/2002 |
| JP | 2003058672 | 2/2003 |
| JP | 2003150835 | 5/2003 |
| JP | 2006012115 | 1/2006 |
| JP | 2007140841 | 6/2007 |
| JP | 2007318364 | 12/2007 |
| JP | 2008305037 | 12/2008 |
| JP | 2009508275 | 2/2009 |
| JP | 2010108082 | 5/2010 |
| WO | 2010011603 | 1/2010 |
| WO | 2011005072 | 1/2011 |
| WO | 2011076070 | 6/2011 |

OTHER PUBLICATIONS

Kim et al., "A preference scoring technique for personalized advertisements on Internet storefronts", Mathematical and Computer Modeling, vol. 44, No. 1-2, Jul. 1, 2006. pp. 3-15.

* cited by examiner

RECOMMENDING CONTENT INFORMATION BASED ON USER BEHAVIOR

CROSS REFERENCE TO OTHER APPLICATIONS

This application is a continuation of co-pending U.S. patent application Ser. No. 13/585,552, entitled RECOMMENDING CONTENT INFORMATION BASED ON USER BEHAVIOR filed Aug. 14, 2012 which is incorporated herein by reference for all purposes, which claims priority to People's Republic of China Patent Application No. 201110235267.5 entitled A METHOD AND DEVICE OF RECOMMENDING E-COMMERCE INFORMATION BASED ON USER BEHAVIOR filed Aug. 16, 2011 which is incorporated herein by reference for all purposes.

FIELD OF THE INVENTION

The present application relates to the field of e-commerce technology. In particular, it relates to a method and device of recommending e-commerce information based on user behavior.

BACKGROUND OF THE INVENTION

E-commerce has thrived as Internet technology has developed. E-commerce uses computer technology, network technology, and remote communications technology to enable buyers and sellers in commercial transactions to carry out various commercial activities without having to meet in person. In order to carry out a commercial transaction, a buyer must gain prior knowledge of the content information concerning a product, information that will help him or her decide whether or not to buy the product. The product content information comprises the product categories under which the product is classified, the supplier of the product, product price, and other types of information relating to the product. On an e-commerce information transaction platform, there are two main methods of acquiring said content information. The first method is a search conducted on the initiative of the user (buyer). That is, after determining their own purchase needs, users put their requests into the form of keywords and then use the keywords to perform searches in vast quantities of diverse data and thereby acquire the content information that they need. The other method is the user passive receiving model. That is, the seller recommends product content information to users through e-commerce transaction platforms. After passively receiving seller-recommended product content information, they purchase the appropriate products under the guidance of this content information. With regard to the second method, the seller in the transaction, seeking to increase its transaction success rate, often will not recommend all of its own information to users, but first analyzes past user behavior and establishes user preference data. Then, in accordance with user preferences, it recommends, in a targeted manner, specific information that might be of interest to users. Such a recommendation method can significantly improve users' experiences in e-commerce information transactions. It can increase the accuracy of seller exposure and effectively lead users into becoming buyers, thereby lowering transaction costs. However, when the recommender of the e-commerce information analyzes user preferences, the user behavior historical data which it obtains might contain biases and errors and might even include fraudulent data that pretends to be user activities but in fact are generated for the purposes of misguiding how products are recommended to the user. The analytical results established on such data foundations inevitably fail to reflect true user preference characteristics, with the result that recommended content information deviates from user needs and recommendation results are adversely affected. In addition, because especially huge volumes of information are accessed at e-commerce websites and vast quantities of user behavior data are found at e-commerce website servers, the analysis of vast quantities of user behavior data to obtain user preference data is severely trying on the processing capabilities of the recommendation system itself. The vast quantities of user behavior data slow the analytical processing speed of the recommendation system.

BRIEF DESCRIPTION OF THE DRAWINGS

Various embodiments of the application are disclosed in the following detailed description and the accompanying drawings.

DETAILED DESCRIPTION

Figure 1:
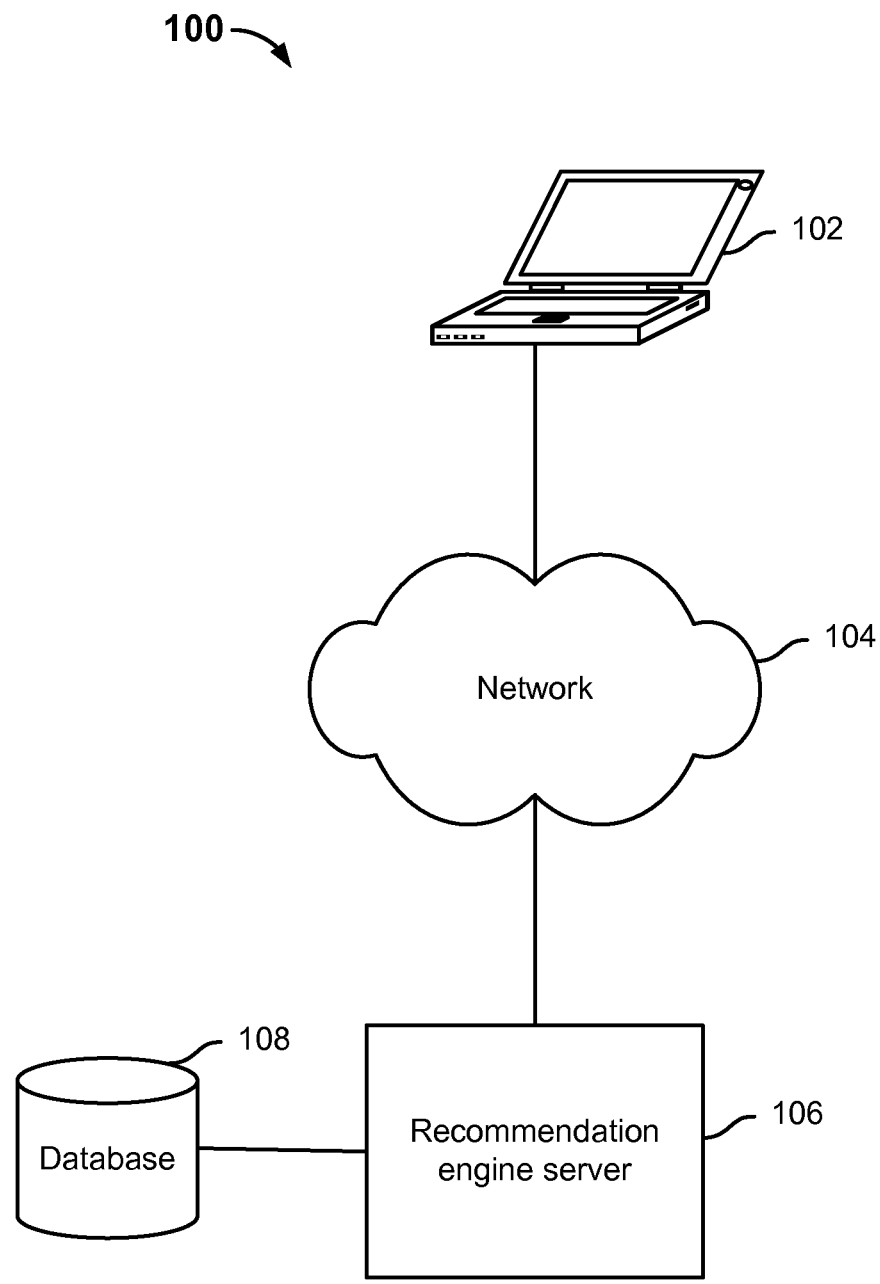
FIG. 1 is a system diagram illustrating an embodiment of an e-commerce information recommendation system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application determines user behavior categories and the user behavior frequencies corresponding to user behavior categories, compares the statistical results with preset threshold values so as to filter out "counterfeit data," such as malicious and fraudulent behaviors, and then, on the basis of the aforesaid optimized user behavior data, conducts user preference analysis and, on the basis of the user preference features obtained from the analysis, makes recommendations of the appropriate content information.

Embodiments of the present application eliminate suspicious (e.g., abnormal, fraudulent, and malicious data) from historical user behavior by comparing historical user behavior categories and frequencies corresponding to these categories with preset threshold values. User preference analysis is conducted on the basis of this processed data. Recommendations of content information are made with user preference data obtained from this analysis. As a result, user preferences obtained from user behavior data are typically more accurate, can truly reflect the actual needs and expectations of users, can lead to better recommendation results, and have a higher success rates in e-commerce information transactions. When recommended product information matches the actual needs and wishes of users, users can rely on the information recommended by the e-commerce transaction platform to complete their transactions without having to repeatedly look up the product information that they need, thus reducing the amount of processing required on e-commerce platforms which is caused by repeatedly looking up product information. In addition, because the optimization by the present application has eliminated large quantities of "counterfeit data" from user behavior data, there is a lower volume of data used in information recommendation analysis and higher speeds at which information recommendation analysis is conducted. Recommendation information can be acquired more quickly.

To enable persons skilled in the art to gain a better understanding of the features and technical contents of the present invention, detailed descriptions of technical schemes of the present application are presented below in light of the drawings and embodiments.

An e-commerce information transaction platform is a simulated market where buyers and sellers can complete transactions without having to engage in face-to-face discussions. The success of the transaction is decided by what the buyer desires to purchase and how closely it is matched by the content supplied by the seller. The seller can increase its exposure rate and transaction success probability by actively supplying product information. However, if the content supplied by the seller deviates too much from the buyer's needs, then the seller might end up with very meager results. Therefore, to raise the transaction success rate, the promotional actions taken by the seller usually need to be based on analysis of users' behaviors, preferences, etc. Such analysis requires prior collection of large quantities of user information, including user historical behavior data, user attribute data, and other such contents. The user information is used for training that produces tendency-predicting data for particular content information. Then, the user preferences of a specific user are matched with this tendency-predicting data in order to decide how to recommend the appropriate content information to the user. Analysis of user preferences is generally based on user historical behavior data. User historical behavior reflects user purchasing desires. For example, the actions of a certain user are concentrated—occur at a high frequency—within a period of time, and the content information targeted by these actions is concentrated among certain products, thus indicating that the preference of the user within this period of time is for these products. The user is very likely to purchase these products, and the transaction success rate will necessarily rise if the information provider can provide product information that matches this preference.

However, as was discussed in the Background of the application, the historical behavior data of some users might not be authentic; it might be "counterfeit data." For example, a large proportion of users might pay attention to a certain product within a certain period of time. This would indicate that the product is a trendy product during that period of time. Because the personal preferences of users are affected by mass consumer trends, individual user preferences will turn toward that product's information, resulting in considerable profits for sellers who deal in the product. In the scramble for profits, some sellers grasp this psychology of the users and, posing as users, repeat certain actions on a large scale within a certain period of time in an attempt to induce a consumption trend. Such counterfeit data will appear within the historical behavior data of such users. A user preference analysis based on such data will be distorted and then cause the recommended content information to deviate from the true needs of users, thus lowering the transaction success rate. In addition, since analysis of user preferences needs to be based on vast quantities of historical user behavior data, and since some sellers maliciously pose as users to repeat certain actions on a large scale within a certain period of time, the resulting increase in the quantity of historical behavior data on which user preference analysis is based leads to a slowing of the rate of user preference analysis. Embodiments of the present application provide a technique of recommending e-commerce information based on user behavior. In some embodiments, the technique includes optimization of historical user behavior data so as to filter out any abnormal data, including counterfeit data or other data that does not truly reflect users' interests and desires.

FIG. 1 is a system diagram illustrating an embodiment of an e-commerce information recommendation system. System 100 includes client device 102, network 104, recommendation engine server 106, and a database. Network 104 includes any high speed data and/or telecommunications network.

Client device 102 is configured to run an application such as a web browser through which a user can access a website. In various embodiments, a user uses client device 102 to access an electronic commerce website at which the user can receive content information recommendations. Examples of device 102 include a desktop computer, a laptop computer, a handheld device, a smart phone, a tablet, a mobile device, or any other hardware/software combination that supports client access.

Recommendation engine server 106 is configured to determine content information based on user behavior data. As shown, a database 108 is used to store user behavior data for users on the e-commerce platform and provide it to the recommendation engine server for analysis.

Figure 2:
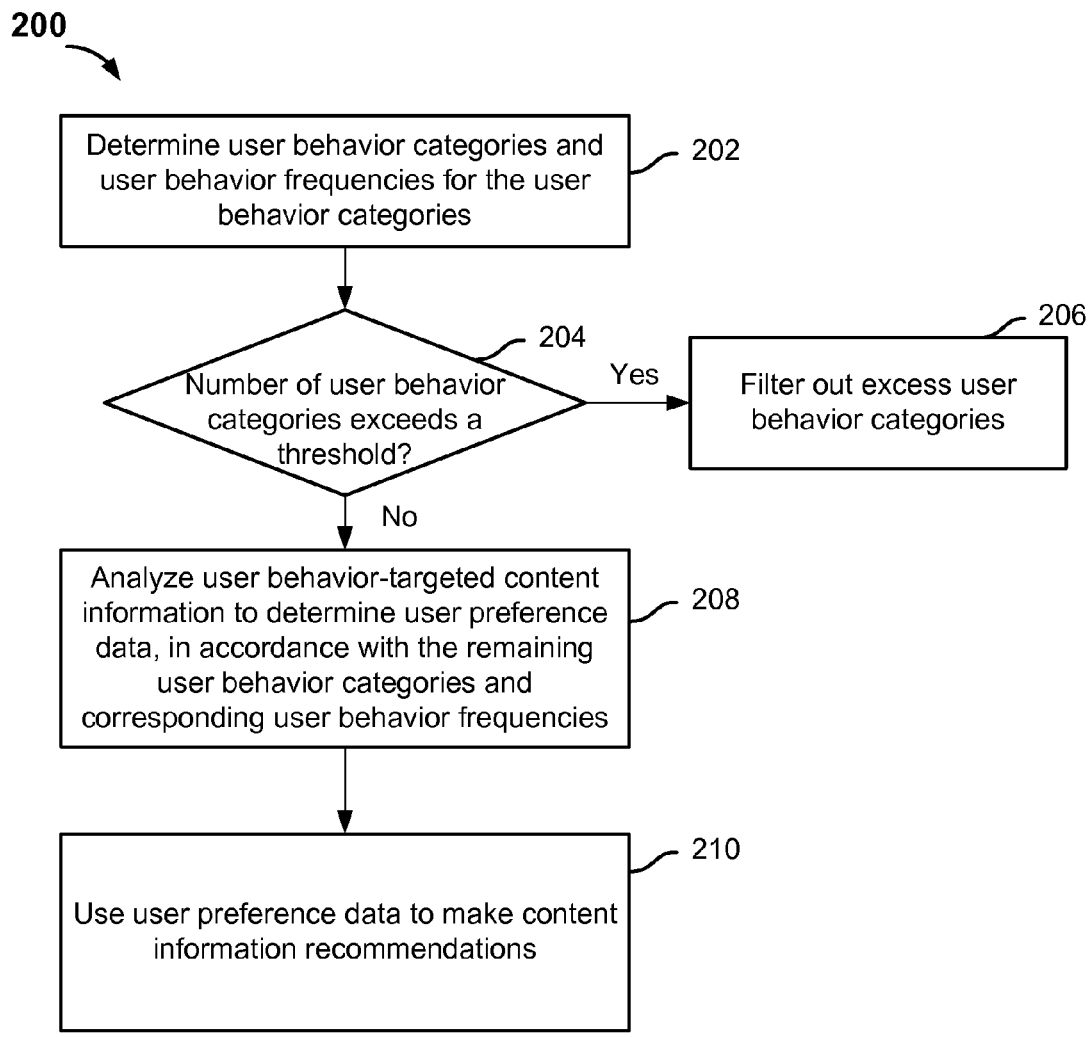
FIG. 2 is a flowchart illustrating an embodiment of a process for recommending e-commerce information based on user behavior.

FIG. 2 is a flowchart illustrating an embodiment of a process for recommending e-commerce information based on user behavior. Process 200 can be implemented on a system such as 100 of FIG. 1. Process 200 includes the following:

202: determining the user behavior categories within a preset period and the user behavior frequencies corresponding to the user behavior categories.

In some embodiments, the acquisition of user preference data is based on analysis of historical behavior of users. The analysis is premised on selection of a reference time period, i.e., a preset period. The length of this preset period will affect the results of user preference analysis. The selected quantity of user behavior categories and user behavior frequencies vary according to the length of the preset period. The resulting user preferences may also vary widely. Generally speaking, it is best not to select a preset period that is too long. If too long, it will not be able to accurately reflect drift characteristics and subtle variations in user preferences. Alternatively, if too short, the user preferences might not be representative. In some embodiments, 30 days is used as the preset period, which can be adjusted to longer or shorter depending on whether an adequate amount of data is collected.

After the preset period is determined, a statistical analysis is performed on user behavior categories in this preset period and on user behavior frequencies corresponding to these categories. As used herein, user behavior categories refer to the types of actions performed by users of the e-commerce platform. In some embodiments, the user behavior categories include, but are not limited to, search actions (e.g., keyword searches), browsing actions (e.g., using browsing functions provided by the webserver), selections (e.g., clicking on a specific item to review item details), save actions (e.g., saving an item to a wish list), purchase actions (e.g., actually buying an action), review actions (e.g., making a product review), etc. In some embodiments (especially when the platform is large and there is lots of user data), the user behavior categories can be finer grained. For example, searches in literature books, searches in travel books, and searches in gardening supplies are defined as separate user behavior categories. The actual categories can be defined by the system administrator or according to preconfigured schemes.

As used herein, the user behavior frequency refers to the number of times that a certain category of user behavior occurred within the preset period. In the example described below, it is assumed that 5 behavior categories are counted within the preset period T. In this example, the five behavior categories act1, act2, act3, act4, and act5 correspond to searching, selecting, saving, purchasing, and reviewing actions, respectively. For the particular user, the user behavior frequencies corresponding to the five categories are f1, f2, f3, f4, and f5, respectively. Because of the existence of abnormal data, such as counterfeit data, some of the five user behavior categories described above may not truly represent the user's behaviors.

204: determining whether the number of user behavior categories exceeds a preset category threshold value. If so, the user behavior categories may contain abnormal actions that are not as predictive of the user's preferences. Such actions should be excluded when establishing user behavior preference data. Otherwise, they will affect the recommendation results of recommendations made on the basis of preference data. The basis of fraudulent data exclusion is a preset category threshold value. This preset threshold value can be statistical data derived from analysis of large quantities of user actions during a certain period of time. It can also be an empirical estimate derived from actual operations. For example, the operator may observe or the system may statistically determine that users in a system typically engage in no more than four categories of activities in a 30 day period, and thus the preset category threshold value $\theta_{actth}=4$ categories of user behaviors. The threshold value can be adjusted according to recommendation results.

If the number of user behavior categories does not exceed the threshold value, control is transferred to 208. Otherwise, at 206, one or more excess user behavior categories are filtered out (e.g., excluded) such that the number of retained user behavior categories equals the preset category threshold value. If a user engages in 5 user behavior categories but the preset threshold value is 4, then it is likely that one of the behavior categories of the user contains abnormal actions that are not predictive of the user's preferences and should be filtered out.

Various filtering criteria are used in different embodiments. In some embodiments, the behavior categories are sorted by date, and the category comprising the earliest behaviors can be filtered out first because this category may already be "out of date" as to its influence on user preference. For example, if a user did several searches earlier in the first few days of the 30 day period but did not perform any searches after that, he may no longer be interested in finding whatever he was looking for, and thus the search category is filtered out. Details of how to determine which category is the earliest are described below. In some embodiments, the user behavior category having the highest frequency is filtered, since this highest-frequency user behavior can represent fraudulent behavior. For example, if a user suddenly starts to post many product reviews, this behavior may be fraudulent and should be filtered. In some embodiments, the filtering techniques are applied multiple times to filter out the appropriate number of excess categories and retain the desired number of categories. In some embodiments, the user behavior categories are sorted by date or frequency, and several of the earliest or most frequent categories are filtered to achieve a threshold number of categories. Besides date and frequency, other filtering criteria can be applied in other embodiments.

In some embodiments, additional filtering is optionally performed. The optional filtering can take place prior to, subsequent to, or in parallel with the filtering of step 206. For example, in some embodiments, any user behavior frequency that is deemed to be abnormal (e.g., an abnormally high or low frequency of occurrence as compared with some preset threshold that corresponds to a normal rate of occurrence) is optionally filtered out. In some embodiments, any user behavior frequency that is deemed to be abnormally high or abnormally low is replaced with the threshold value.

208: analyzing content information targeted by user behaviors to determine user preference data, in accordance with the remaining user behavior categories and their corresponding user behavior frequencies. In this example, the user preference data includes the frequency distribution of each piece of content information.

Every user action (e.g., buying a book, putting a product into the shopping cart, writing a product review, searching for a product, etc.) corresponds to one or more action targets. The action target is the content information towards which the user action is directed. This content information can be unitary information or compound information. For example, a user searches within an e-commerce platform for a product. The user behavior category is thus "search action." The content information targeted by this search action is the product, specifically one or more attributes associated with the product that are of interest to the user performing a search action, such as product price range, product shipping cost, the product category under which the product is classified, product producer, provider credentials, etc. Each attribute thus corresponds to a type of content information. As another example, when a user provides product review for a product, he is generally not concerned with shipping cost or product producer information of the product. Thus, the targeted content information includes the product category and price range. There are many different user behavior-targeted content information mappings. In some embodiments, the targeted content information corresponding to each type of user behavior is determined empirically and is subject to change. In some embodiments, the attributes/content information type can be finer grained. For example, different product producers can correspond to different content information types, different product categories can correspond to different content information types, and so on.

In the example described above, assume that of the 5 categories of user behaviors, the category corresponding to act1 is filtered out. Further, assume that 5 pieces of content information, C1, C2, C3, C4, and C5, correspond to product category, product producer, product price range, product shipping cost, and product rating, respectively. Since the user performs different acts in different context to obtain different results, each act can target different pieces of content information. Act2 targets three pieces of content information, C1, C2, and C3 (e.g., in this case, the act of saving a product targets the product category, the product producer, and the product price range, but does not target shipping cost or product rating). The frequencies of these three pieces of content information as targeted by act2 are denoted as f21, f22, and f23, respectively. The frequency distribution data for act2 is expressed as act2 (C1[f21], C2[f22], C3[f23]). Act3 targets content information C1, C2, C3, C4, and C5; the frequency distribution data for act3 is expressed as act3 (C1[f31], C2[f32], C3[f33], C4[f34], C5[f35]). Act4 targets content information C2, C3, and C5; the frequency distribution data for act4 is expressed as act4 (C2[f42], C3[f43], C5[f45]). Act5 targets content information C2, C3, C4, and C5; the frequency distribution data for act5 is expressed as act5 (C2[f52], C3[f53], C4[f54], C5[f55]). Accordingly, the frequency distribution for the 5 pieces of content information is: fc1=f21+f31, fc2=f22+f32+f42+f52, fc3=f23+f33+f43+f53, fc4=f34+f54, and fc5=f35+f45+f55. The values are illustrated in Table 1.

TABLE 1

| | C1 (product category) | C2 (product producer) | C3 (product price range) | C4 (product shipping cost) | C5 (product rating) |
|---|---|---|---|---|---|
| Act2 | f21 | f22 | f23 | | |
| Act3 | f31 | f32 | f33 | f34 | f35 |
| Act4 | | f42 | f43 | | f45 |
| Act5 | | f52 | f53 | f54 | f55 |
| | fc1 = f21 + f31 | fc2 = f22 + f32 + f42 + f52 | fc3 = f23 + f33 + f43 + f53 | fc4 = f34 + f54 | fc5 = f35 + f45 + f55 |

Figure 3:
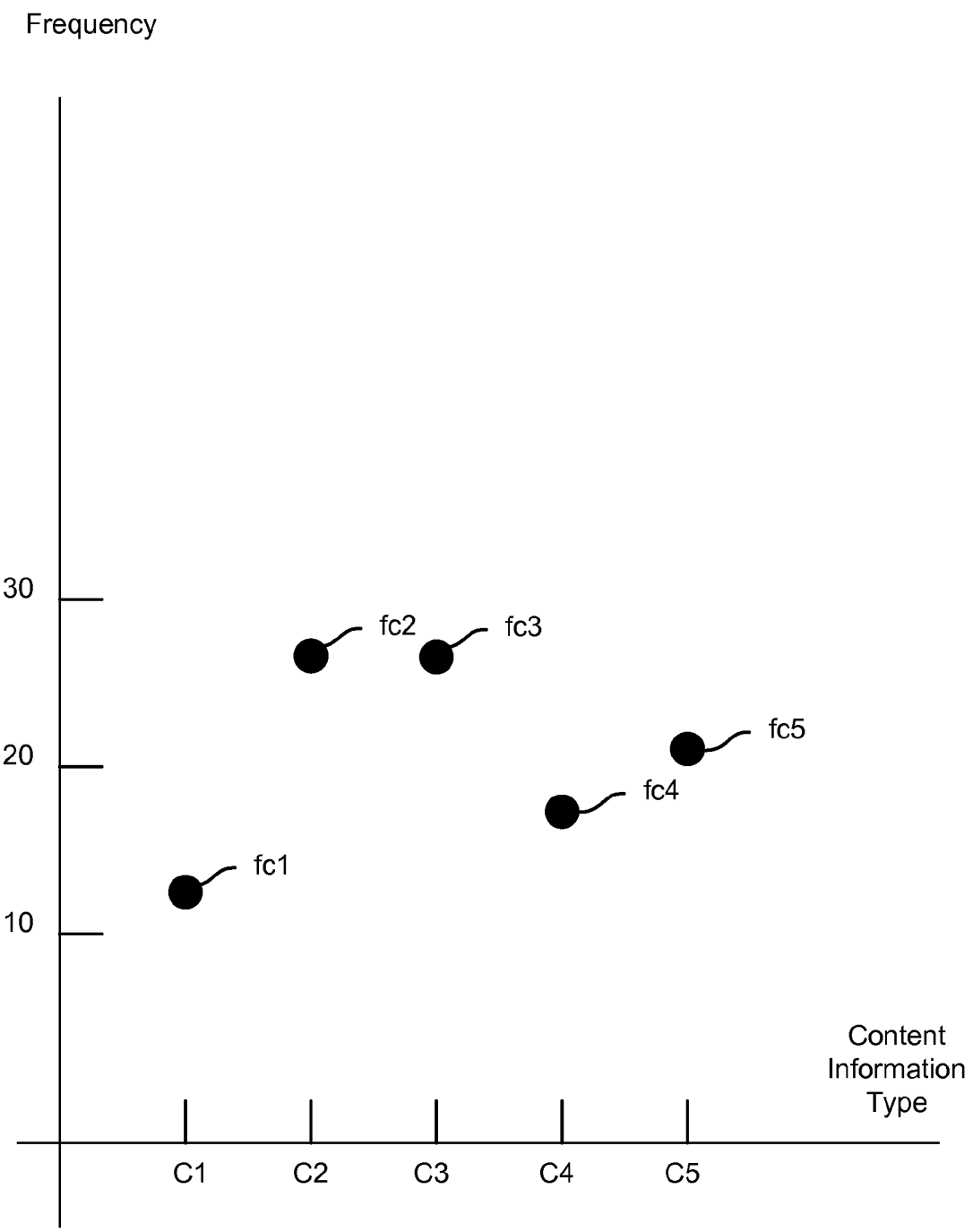
FIG. 3 shows an example plot of user preference data that shows the frequency distributions of the 5 pieces of content information C1-C5.

FIG. 3 shows an example plot of user preference data that shows the frequency distributions of the 5 pieces of content information C1-C5. Different criteria can be used to select the appropriate pieces of content information as the user preference data. In some embodiments, the content information corresponding to the highest frequency is selected as the user preference data. In the example shown in FIG. 3, C2 and C3 are selected since these two pieces of content information have the highest total frequency. In some embodiments, a preset value is determined, and any content information with a total frequency that exceeds this preset value is selected as the user preference data for this user. In this example, if the preset value is set to 20, then C2, C3, and C5 are selected since their corresponding frequencies are greater than 20. In some embodiments, the top N content information with the highest total frequencies is selected. For example, if N=3, then C2, C3, and C5 are selected.

Returning to FIG. 2, at 210, the process uses user preference data to make content information recommendations. In other words, content information deemed to be most relevant based on the frequency distribution of the content information is recommended to the user. There are many different ways to determine relevancy. For example, if C1 is selected, products in a product category deemed to be most frequently targeted by the user's actions is recommended to the user; if C4 is selected, then products with the lowest shipping cost are recommended to the user; if C4 and C5 are selected, then products that have the lowest shipping cost and highest product rating are recommended to the user; if C2, C4, and C5 are selected, then products that are made by the most popular product producer, have the lowest shipping cost and the highest product rating are recommended to the user. Any appropriate recommendation techniques based on user preference can be used. As will be described in greater detail below in connection with FIG. 7 and Table 2, in some embodiments, machine learning techniques are applied to historical user data to determine rules for making the recommendations.

The embodiment described above filters out suspicious data from user behavior through matching it with a preset category threshold value. User behavior data that has been thus filtered can better reflect the true preferences of users. However, user actions often vary as to when they occur within the preset period T. The different times of occurrence have varying effects on analysis of user preferences. Generally speaking, the closer a user action is to the end of the preset period T, the more likely the action will be a true preference of the user. Similarly, the closer a user action is to the beginning of the preset period T, the less likely the action will be a true preference of the user. In some embodiments, the user behavior data is optionally subject to a time effect elimination treatment. Such treatment can take many specific forms, so long as the treatment results in a later user action having a greater impact on the user preferences than an earlier user action of the same kind. In some embodiments, the time effect elimination treatment is carried out as a part of the analyzing step 208 to adjust the user behavior frequencies. In some embodiments, a time weight is multiplied with each user action, where the time weight increases with a more recent user action that occurred closer to the end of a preset period and decreases with a more distant user action that occurred closer to the beginning of the preset period, thus modifying the user behavior frequency value.

By subjecting user behavior data to time effect elimination treatment, the present embodiment further increases the accuracy of user preferences established on the basis of user behavior and thus further improves recommendation results.

Although time effect elimination can take on quite a few specific forms, in this embodiment of the present application, time weights can be calculated preferably in accordance with the formula below:

$$\text{time weight} = 1/\log(D_{\mathit{off}})$$

where $D_{\mathit{off}}$ is the time difference between the time when the user behavior occurred and the end of the preset time period.

In some embodiments, after a time weight has been assigned to the user action, the frequency value attributed to each user action is adjusted by multiplying it by the corresponding time weight, and an overall frequency for this category of user behavior is computed by adding up the adjusted frequency values. User behavior data optimized in this fashion can more accurately reflect preference characteristics of the user during a preset period.

In another aspect, user behavior-targeted content information is the basis of user preference analysis. However, the content information that is targeted while the user is performing certain user actions is limited by the knowledge and abilities of the user and may not be accurate. Thus, the result that analysis is based thereon may give rise to errors. For example, the user implements a search action and this search action targets a keyword. This keyword is a keyword determined on the basis of the user's own knowledge, yet this key word may not be an accurate description for a desired product. For example, a user may enter in the keywords of "scooter bike" when the accurate description of the product is "balance bike." Thus, in some embodiments, a "deviation correction" is optionally performed to obtain standardized, corrected data to be used for conducting user preference analysis (e.g., prior to step 208 of process 200).

In some embodiments, performing deviation correction includes correcting content information in accordance with a standard product unit and industrial knowledge banks. The standard product unit (SPU) is a re-usable, standardized information set that can be easily searched. For example, multiple sellers may post information about the same brand and model of mobile phone, but with different names, descriptions, etc. The information is captured and standardized into a single SPU, which describes the characteristics of the product and stores basic information about the product. Detailed descriptions of how SPUs are created can be found in U.S. patent application Ser. No. 12/456,806 entitled METHOD AND APPARATUS FOR PROVIDING DATA STATISTICS, filed Jun. 22, 2009, which is incorporated herein by reference in its entirety for all purposes. An industrial knowledge bank is the knowledge bank for an industry. This "knowledge" includes industry standards, industry business models, industry business data and information models, information-based industry panoramas, industrial field components, industry purchasing chains, industry upstream/downstream products, and so on. The content covered by this knowledge bank is considerable. After the targeted content information based on user behaviors is determined, each piece of targeted content information is looked up and compared with standard product units and industry knowledge banks. If there is a difference between the piece of targeted content information and the corresponding description in the SPU database or the industrial knowledge bank, the standard language of the standard product unit or the industry knowledge bank is used to describe this piece of content information. Content information that has been standardized in this fashion lends itself more easily to identification and processing in subsequent steps.

The embodiment described above made use of a reference time period, i.e., the preset period T. User preference data is obtained from analysis performed on user behavior categories and user behavior frequencies for this period of time. However, users might experience preference drift (variation) within this period of time. In other words, a user might be interested in content information 1 during one time segment and interested in content information 2, which is related to content information 1, during another time segment. For example, a user may be interested in a book (content information 1) when it was first published; years later, when a movie on DVD (content information 2) based on the book is released, the user may also be interested in the movie on DVD. Content information 1 and content information 2 are said to form a drift pair, and the user preference data includes the drift characteristic of user preferences. When analyzing user behavior that has preference drift characteristics, only the content information (content information 2) corresponding to the drift terminal point of the drift pair truly represents the current interest of the user. The assumption is that the user has already given up on the content information (content information 1) corresponding to the drift start point of the drift pair and is no longer interested in this. Therefore, the content information corresponding to the drift terminal point should be regarded as the user's preference, and content information recommendations should be made on the same basis.

In addition to user preference drift, the user might develop an extreme interest in certain content information, with extremely high user action frequency, within a certain time segment of the preset period (for example, right after an earthquake, the user suddenly becomes very interested in earthquake survivor kits). Such a situation constitutes the characteristic of suddenness relating to a user preference. This characteristic is unstable. It represents a user's preference that is merely emotional and cannot represent a preference throughout the preset period (for example, the user is no longer interested in earthquake survivor kits after making a single purchase). Therefore, it should be eliminated during analysis of user preferences. The opposite of the suddenness characteristic in user preferences is the user preference continuity characteristic. That is, the user's preference is concentrated on a particular few pieces of content information during a time segment (e.g., selection or query of books by a particular author). During another time segment, the user's preference is still concentrated on these pieces of content information. Such a situation indicates that the user's preference is relatively stable and that this user behavior data can reflect user preference relatively well. Content information recommendations made on the basis of such user preferences have a very high probability of complying with the user's needs and of thus increasing the transaction success rate. The present application thereby presents a further embodiment. This embodiment adds the filtering out of the sudden and drifting user preferences described above and the retaining of continuous user preferences.

Figure 4:
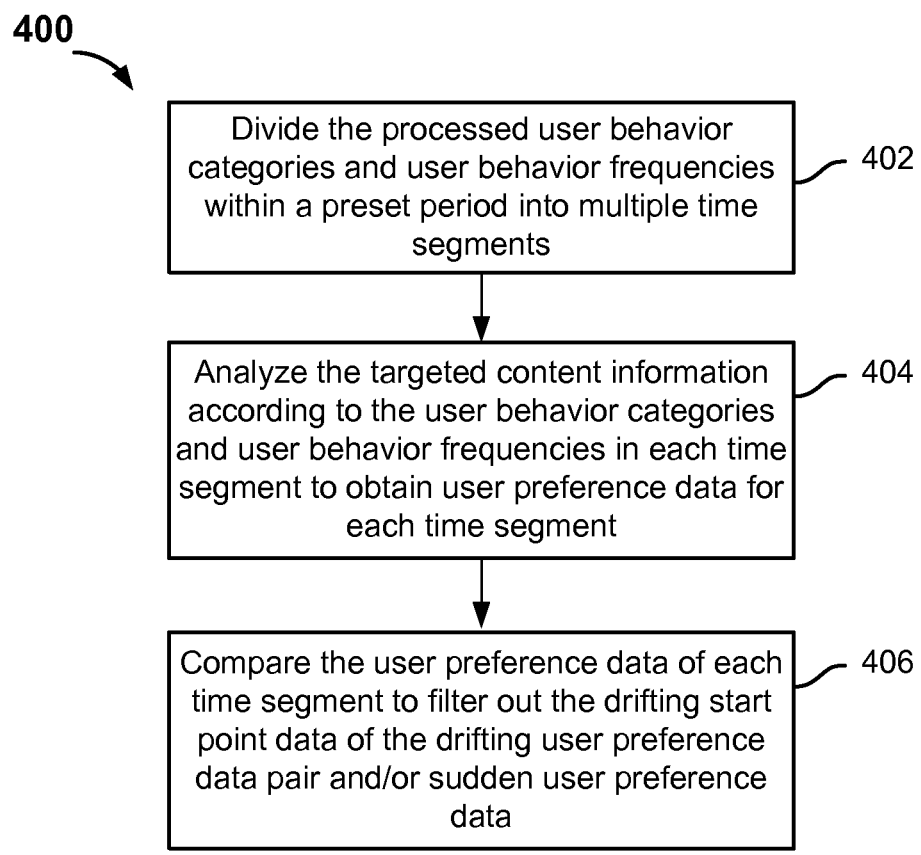
FIG. 4 is a flowchart illustrating an embodiment of a process for obtaining user preference data from analysis.

FIG. 4 is a flowchart illustrating an embodiment of a process for obtaining user preference data from analysis. Process 400 can be used to implement step 208 of process 200. The process includes:

402: dividing the processed user behavior categories and user behavior frequencies within a preset period into multiple time segments according to when the user behaviors occurred. In some embodiments, the time segments are of equal length.

The shorter the length of the time segments selected for the preset period, the finer the user preferences will be. By using a user preference curve that compares different time segments, one can obtain sudden user preferences and drifting user preferences. The preset period T is divided into at least two time segments of equal length; two or more segments may be selected according to actual need. The greater the number of time segments selected, the more subtle the information will be on user preference variation. For the sake of convenience, two time segments are used here as an example: T1 and T2, where T1+T2=T.

404: analyzing user behavior-targeted content information according to the user behavior categories and user behavior frequencies in each time segment, and obtain user preference data for these time segments.

The process separately analyzes user behavior categories and user behavior frequencies for time segments T1 and T2, and analyzes targeted content information. The analysis process can be carried out by plotting a curve in which targeted content information is the horizontal axis and the frequency of user content information is the vertical axis.

406: comparing the user preference data of each time segment to filter out the drifting start point data of the drifting user preference data pair and/or sudden user preference data and thus obtain user preference data for the entire preset period.

After user preference curves for the two time segments T1 and T2 are obtained, the two curves are subjected to comparative analysis. The process takes content information which is found in both time segments and retains it as continuous preference data. The process regards content information which appears only in the first time segment as the drifting user preference data drift start point and filters it out. The process further regards content information which appears only in the second time segment as the drifting user preference drift terminal point and retains it. The process also filters out sudden user preference data (e.g., content information that is targeted with abnormally high frequency as compared with the average frequency that content information is typically targeted with) that appears in either time segment. The result is user preference data for the entire preset period T.

By dividing the preset period into smaller periods and then, following the division, comparing user preference data changes in each time segment, the present embodiment filters out drifting and sudden user preference data. User preference data obtained in this fashion more accurately reflects user preferences over the entire preset period. This results in better content information recommendations, which are made on the basis of this user preference data.

Figure 5:
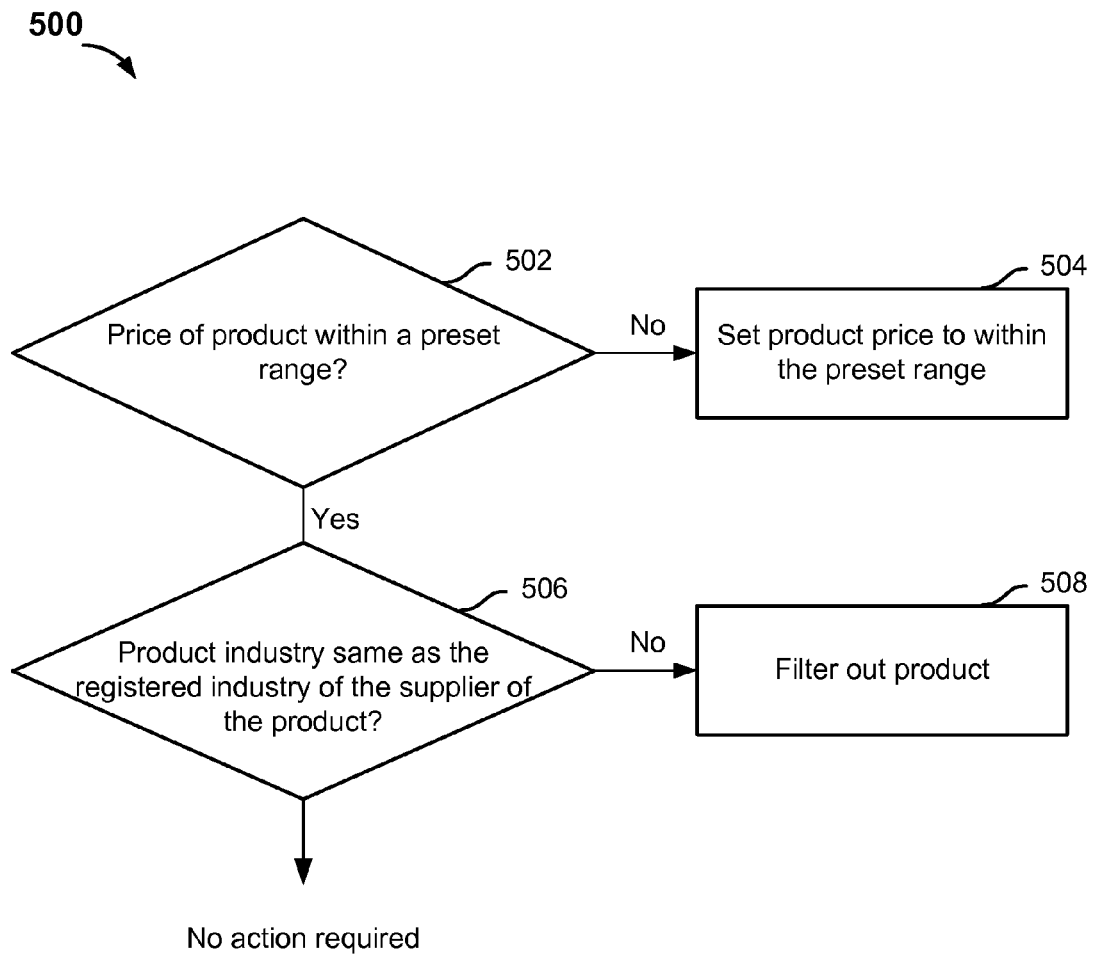
FIG. 5 is a flowchart illustrating an embodiment of a process for filtering counterfeit content information.

More accurate user behavior data is obtained using the embodiments described above. Through a series of optimizing procedures, they filter out the "counterfeit data" in user behavior and lay a better foundation for gaining accurate user preferences through analysis. In another aspect, the accuracy of the user behavior-targeted content information also needs to be improved. Content information is the starting point for analysis of user preference, yet this content information is provided by e-commerce information sellers. In fighting for profits and customers, some sellers will maliciously fabricate "counterfeit data" in relation to content information. For example, a seller may intentionally list a very low price for a product, but charge a very high shipping and handling fee. Such behavior disrupts the e-commerce information transaction markets. The results of user preference analysis on this "counterfeit" content information might be greatly distorted. Thus, in some embodiments, counterfeit content information is detected. FIG. 5 is a flowchart illustrating an embodiment of a process for filtering counterfeit content information. Process 500 can be used as a part of or prior to step 208 of process 200. Process 500 includes:

502: determine whether the specified price of a product is within a preset price range. The preset price range can be a historic average range by different sellers of the same product. If not, at 504, the process sets the product price within the preset price range (typically the value is set to the upper or lower limit of the threshold). If the price falls within the preset range, at 506, the process optionally determines whether the industry to which the product belongs is the same as the registered industry of the supplier/producer for the product; if not, the process filters out this product and its related information so that it is not included in user preference or recommendation analysis.

By optimizing content information, the present embodiment increases the accuracy of data sources for user preference analysis. It helps in obtaining more effective user preference data.

Figure 6:
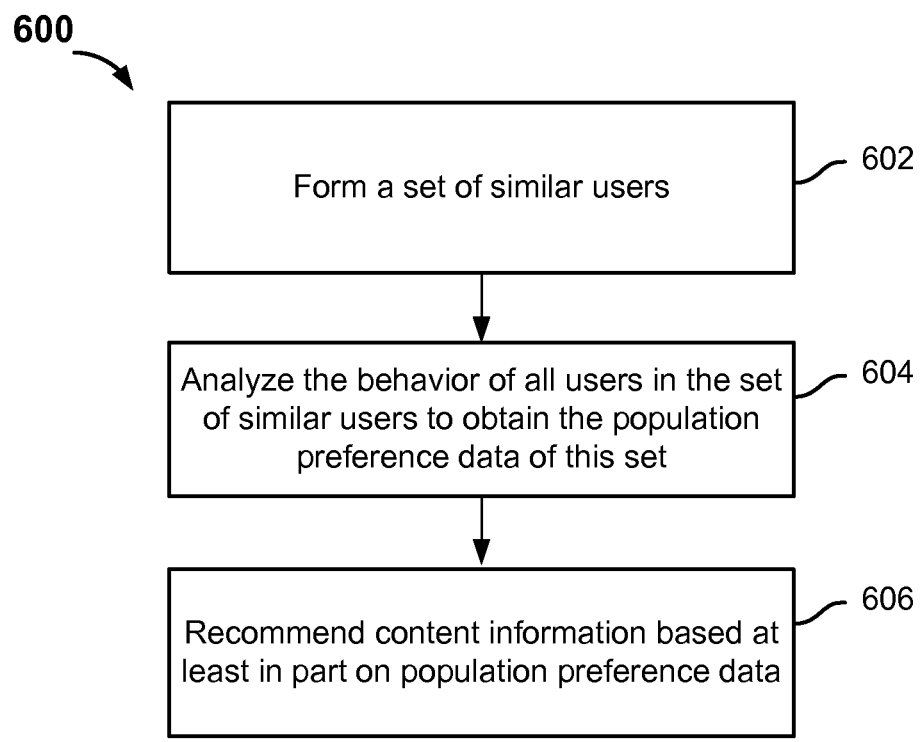
FIG. 6 is a flowchart illustrating an embodiment of a process for providing content recommendations.

In the methods described in the several embodiments described above, the prior art can be employed in methods of specifically implementing information recommendation steps after user preference data has been obtained. In the prior art, content information is generally independent and separate. This kind of recommendation, however, is not always the most effective. When user preferences that are obtained through analysis of user history are used as a basis for recommending content information to the user, such information tends to conform to the user's shopping desires and results in a higher transaction success rate. However, the user preferences of each user actually are in fact not limited to past preferences. While the user's preferences are continually changing, his ability to discover and acquire information to find the best products that suit his needs is typically limited. It is worth exploring the user preference data of other users who have the same or similar preferences as the user, since it is likely that they have the same preferences in other areas in addition to those described above. Therefore, in some embodiments, a coordinated recommendation technique is used, in which a large amount of user content information is analyzed to obtain population preference data for the content information. Content information recommendations are made on the basis of user preference data and population preference data. FIG. 6 is a flowchart illustrating an embodiment of a process for providing content recommendations. Process 600 can be used to implement 210 of process 200.

At 602, a set of similar users is formed. In some embodiments, the process randomly selects a preset number of users to form a reference user set, calculates the similarities of other users to each user in the reference user set, and forms one or more sets of similar users whose similarity exceeds a preset similarity threshold value (which can be determined based on operators' experience or statistical analysis).

In various embodiments, a variety of techniques, such as clustering algorithms, can be employed to calculate the similarities between users. For example, referring to the example described above where user preferences include frequency distributions of content information, the similarity between users can be measured using the cosine similarity values of the users' frequency distributions of content information. Many existing clustering algorithms can be used and details of these algorithms are outside the scope of this specification. The preset threshold value can be determined based on operators' experience or statistical analysis.

At 604, the process analyzes the behavior of each user in a set of similar users to obtain the population preference data of this set, where the population preference data includes the frequency distribution of user behavior for targeted content information. In some embodiments, the population preference data is calculated in the same way as the calculation of preference data for an individual user as described above, except that the frequency distribution accounts for frequencies of content information targeted by actions of all the users in the set. The population preference can guide user preference since it is likely that similar users in a cluster would be interested in similar content.

At 606, the process recommends content information to the users based at least in part on population preference data. In some embodiments, additional content information is recommended to the user based at least in part on the user's personal preference.

By calculating similarities using the clustering techniques, the present embodiment finds other users that have characteristics similar to the user in question. Moreover, it uses the user behavior data of the other users as a reference for making content information recommendations. It thus more effectively expands the content information recommended to the user, enhances user experience, and further broadens the fields and range of e-commerce information transactions. For example, a user may not have demonstrated a preference for science books; however, since similar users have a population preference for science books (e.g., high frequency of targeting science books in the content information of product category), science books can be recommended to the user.

Due to differences in geographic environment and variation in local customs, the user preference data for users within a single area may have greater reference value. Therefore, in the present embodiment, the reference user set is selected in accordance with the following process: the process assesses the geographic region corresponding to the Internet Protocol (IP) address of the user (e.g., the IP address as indicated by the user's current session on the website) and whether it is the same as the registered geographic region of the user (e.g., geographical information designated by the user during the sign-up process); if so, then the process selects other users whose registered geographical region is the same as the registered geographic region of the user to compose a reference users group; if not, then the process selects other users whose registered geographic region is the same as the geographical region corresponding to the IP address of said user to form a reference user set.

In some embodiments, user-registered user data is used as the basis for analyzing population preferences. User behavior data from the same geographic region has greater reference value than user behavior data from other places. The user preference results from analysis of such data are more accurate, and the recommendation results based on such analysis are better. This, in turn, greatly increases the transaction success rate of e-commerce information. Moreover, the adoption of the proximity principle means that users find it much easier to quickly obtain the appropriate products or services after completion of the e-commerce information transaction.

There are different ways to implement the information recommendation step after the preference data has been obtained. In some embodiments, the information recommendation step includes making coordinated recommendations. Making coordinated recommendations includes combining the data of the user awaiting recommendation with population preference data within certain limits (e.g., only the top N most similar users in a cluster are used to make recommendations to a particular user). It thus expands content information that is to be recommended to the user awaiting recommendation (sometimes referred to as "horizontal" expansion).

Figure 7:
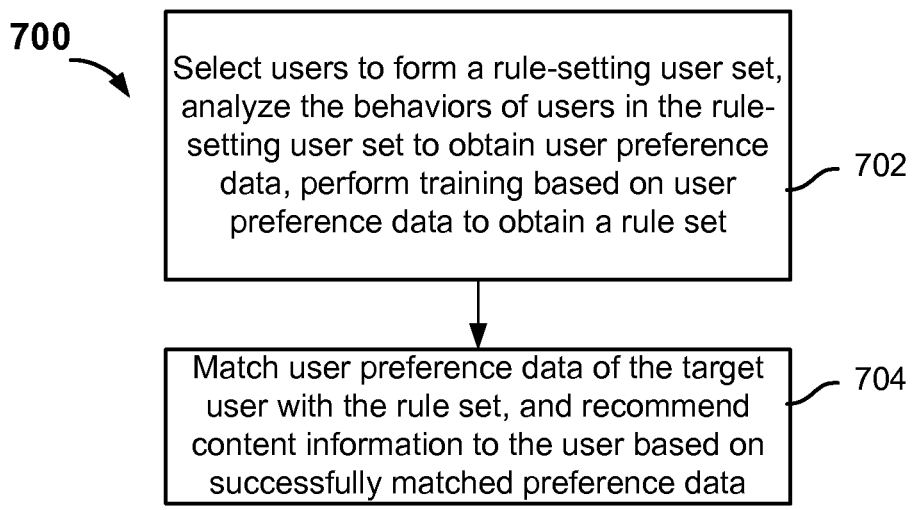
FIG. 7 illustrates an embodiment of a joint recommendation process for recommending content information.

In some embodiments, a vertical expansion technique is used instead of or in addition to the horizontal expansion technique. One example of a vertical expansion technique is a joint recommendation technique, where multiple user preferences in the user preference data are matched with a preset rule set, and one or more successfully matched preferences are taken as a basis for recommending content information to a user. FIG. 7 illustrates an embodiment of a joint recommendation process for recommending content information. Process 700 can be used to implement 210 of process 200.

In this example, at 702, the process selects a preset quantity of users to form a rule-setting users set, analyzes the behavior of each user in said rule-setting users set to obtain user preference data on each user, and conducts training based on user preference data of each user to obtain a rule set. In this example, the rule set includes a combined rule set for predicting each type of user preference for content information recommendations.

In most situations, the user preferences obtained through the analysis of the historical behavior of users are composite preferences. In other words, this user preference data contains multiple preferences of the user within various levels, fields, and time segments, such as product preferences (e.g., preferences for certain product identifier, name, or model), supplier preferences (e.g., preferences for certain supplier identifier or name), product search word preferences (e.g., preferences for search keywords to use when searching for products), purchase request preferences (e.g., preferences for which products are desired even if they are not currently available), and information preferences (e.g., preference for information obtained from discussion forums). Although content information recommendations could be made to the user in accordance with all of these preferences, such a "all concerning" approach would fail to achieve the objective of a higher transaction success rate. On the contrary, it would tend to put users at a loss for what to choose from a huge amount of content information. Therefore, an alternative is to employ an approach to recommending content information to users wherein quality is emphasized over quantity and hit rates are higher. In some embodiments, in order to find a "valid" user preference from among a great number of user preferences, a certain number of users are selected to form a rule-setting users set and to establish a rule set based on the preferences of these users and then to use this rule set as a basis for selecting user preferences. All the user preference data within the rule-setting users set can be acquired using known techniques, or they can be obtained through analysis after user behavior data has been optimized according to the methods put forward in the present application. After obtaining the user preference data of a set of sample users, each preference of the user is combined with the frequency corresponding to the preference to form a vector feature group for the user. An example of a vector feature group is a vector formed based on product, supplier, product search word, purchase request, and information (represented as [product, supplier, product search word, purchase request, information].) Then, the vector feature groups for different users undergo training to obtain rule sets that predict the content information that is most likely to be useful to the user. Specifically, the rules specify content information corresponding to one or more types of user preference data to be recommended to the user given a pattern of past user preference. Many different types of training techniques can be employed, such as decision tree-based or support vector-based machine learning techniques.

At 704, the process matches the user preference data of the target user awaiting recommendation with the rule set, and recommends content information to the user awaiting recommendation based on successfully matched preference data.

In some embodiments, after the rule set has been obtained, the preferences of the user awaiting recommendation are matched with the rules in the rule set. If the match is successful, then content information is recommended to the user based on the matching user preference.

Table 2 offers a detailed example of how process 700 is applied. In this example, the table is used for recommending the preferred category of content information (C1 in the previous example) of a given user. Other types of content information, such as preferred product producers, preferred price range, preferred shipping cost, preferred rating, etc. would each have its own table. For ease of discussion, it is assumed that there are three specific categories (e.g., categories of textbooks) that can be recommended to the user: math, English, and Chinese.

To construct a rule set, it is assumed that 100 users are selected for the rule-setting users set. The users can be selected randomly, or from a pool of users similar to a target user. In this example, it is assumed that there are five sources of information (product, supplier, product word, purchase request, and information), and therefore the preferences of each user include five types of preferences: product, supplier, product word, purchase request, and information. In addition, the user preference data in this set can then be used to obtain the population preferences for this population of 100 users. These population preferences are then used to set rules concerning population preferences.

For a specific target user (such as A1, B2, C3), preference data is obtained by analyzing the historical behavior data of the user, normalized with the data of the 100 users (e.g., dividing the behavior frequency of the user by the total behavior frequency by the 100 users). The preference data includes frequency distributions of the content information and content information type. The frequencies undergo normalization in order to facilitate comparison (e.g., the number of times a particular piece of content information was targeted by an individual is divided by the total number of times the content information was targeted by all individuals). In some embodiments, a normalization benchmark value of 10 is used. For example, 0.6|math for A1 indicates that based on A1's data, for all of A1's behaviors that have to do with product references, A1 prefers the math category with a normalized frequency of 0.6.

Three rules are obtained by training the preference data of the 100 users according to known machine learning techniques. The rules are shown in the right most column of the table.

It is now time to make recommendations to three users, A1, B2 and C3. Each user's preference data is listed in the corresponding column of the table. The rules in the rule set are applied in order (i.e., rule 1 is first applied, and if the user preferences do not match the criteria of rule 1, then check rule 2 followed by rule 3). Content information is recommended in accordance with the successfully matched user preferences. In particular, A1's preferences match rule 1, and therefore content information related to math is made based on A1's product preference; B2's preferences match rule 3, and therefore content information related to English is made based on population preference; C3's preferences match rule 2, and therefore content information relating to Chinese is made based on product word preference.

TABLE 2

| User preference category | | User Name | | | Rule Set |
|---|---|---|---|---|---|
| | | A1 | B2 | C3 | |
| Product preference | Normalized frequency\| preferred category | 0.6\|math | 0\|none | 0.2\|math | Rule 1: If the normalized frequency of product preference is greater than 0.5, then recommend the content information corresponding to product preference. |
| Supplier preference | Normalized frequency\| preferred category | 0.2\|English | 0\|none | 0.1\|math | |
| Product word preference | Normalized frequency\| preferred category | 0.3\|math | 0\|none | 1\|Chinese | |
| Purchase request preference | Normalized frequency\| preferred category | 0\|none | 1\|Chinese | 0\|none | Rule 2: If the normalized frequency of product word preference is greater than 1.2 times the sum of product preference and information preference, then recommend the content information corresponding to product word preference. |
| Information preference | Normalized frequency\| preferred category | 0\|none | 0.5\|English | 0.5\|English | |
| Population preference | Normalized frequency\| preferred category | 0\|none | 4\|English | 0\|none | |
| Results of matching rule set | | Complies with rule 1 | Complies with rule 3 | Complies with rule 2 | |
| Recommended content information (for the preferred category) | | Product preference\|math | Population preference\|English | Product word preference\|Chinese | Rule 3: If the normalized frequency of population preference is greater than 2 times the sum of information preference and purchase request preference, then recommend the content information corresponding to population preference. |

The present embodiment combines many kinds of user preferences and selects the substantially optimal recommendation scheme to carry out content information recommendations. It avoids non-selective recommendations based on all preferences which characterize traditional recommendation methods and thus improves recommendation results and effectively raises the transaction success rate.

Figure 8:
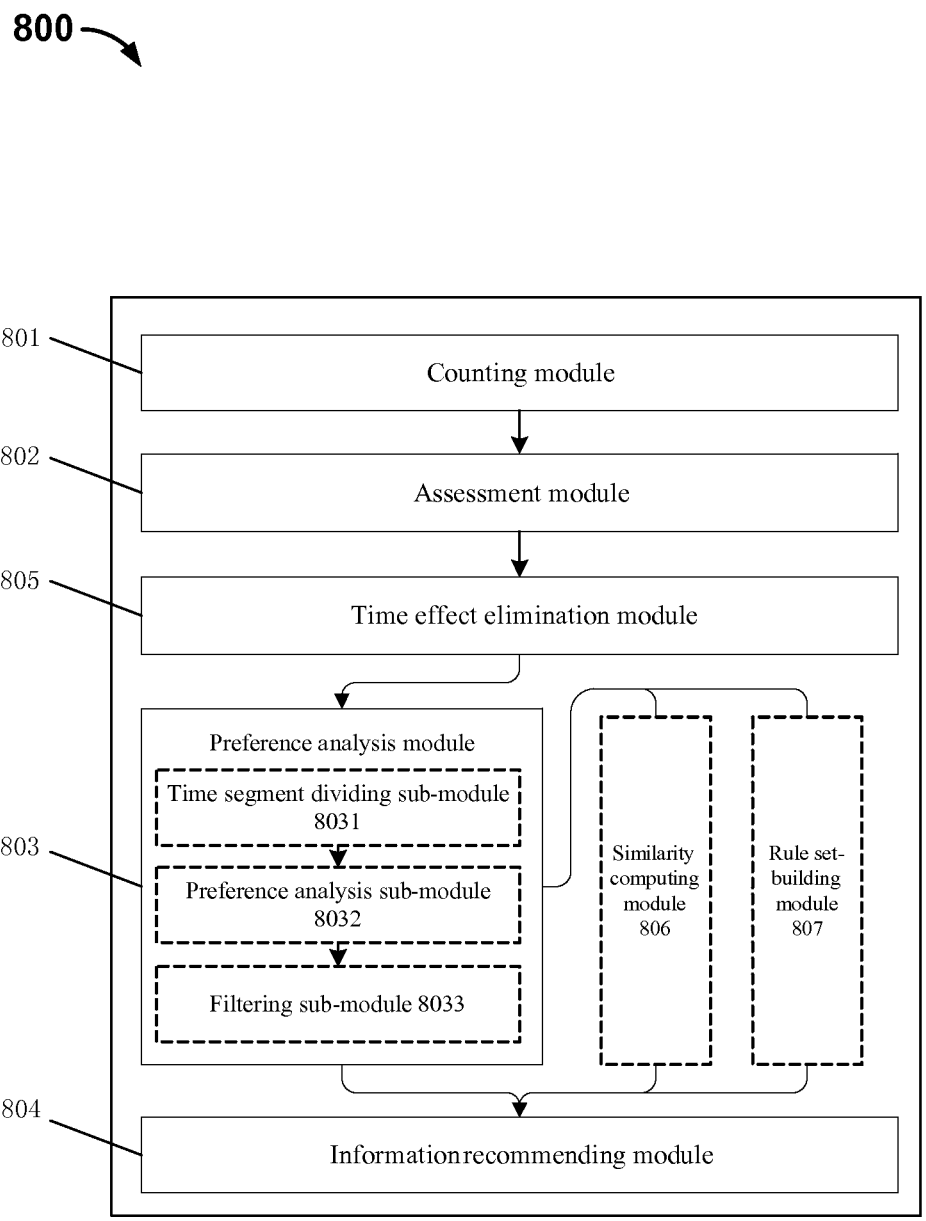
FIG. 8 is a block diagram illustrating an embodiment of a system for recommending e-commerce information based on user behavior.

FIG. 8 is a block diagram illustrating an embodiment of a system for recommending e-commerce information based on user behavior.

System 800 includes a counting module 801, an assessment module 802, a preference analysis module 803, and an information recommending module 804, wherein:

the counting module 801 is used to count the user behavior categories within a preset period and the user behavior frequencies corresponding to each category of user behavior;

the assessment module 802 is used to assess whether the quantity of user behavior categories exceeds a preset category threshold value; if so, then retaining a quantity of user behavior categories that is less than or equal to the preset category threshold value; and/or assessing whether the frequency of each user behavior exceeds a preset frequency threshold value; if so, then taking the preset frequency threshold value as the frequency of the user behavior;

the preference analysis module 803 is used to analyze, in accordance with the user behavior categories and user behavior frequencies that have been processed as described above, user behavior-targeted content information and obtaining user preference data, said user preference data includes the frequency distribution of each piece of content information;

the information recommending module 804 uses the preference data to recommend content information to users.

The operating process of this device is as follows: the counting module 801 counts user behavior categories within a preset period and user behavior frequencies corresponding to each behavior category and transmits the data to the assessment module 802. This module assesses whether the number of user behavior categories exceeds a preset threshold value. If it does, then it either retains a quantity of user behavior categories that is less than or equal to the preset threshold value, and/or it assesses whether the frequency of each user behavior exceeds the preset threshold value frequency for this behavior. If it does, then it sets the preset threshold value frequency as the frequency for this user behavior. Then preference analysis module 803 uses the user behavior categories and user behavior frequencies that were processed as described above to analyze user behavior-targeted content information and obtain user preference data. Moreover, it transmits this data to the information recommending module 804, which uses the user preference data to carry out content information recommendations.

Before it carries out information recommendations based on user preferences, the technical scheme of the present application, by assessing whether user behavior category quantities and user behavior frequencies comply with preset values, optimizes user behavior history. The optimized user behavior data excludes malicious and fraudulent behavior. User preference data obtained through analysis based on this user behavior data more truly reflects the preference characteristics of users and in turn improves the results of information recommendations made on the basis of this user preference data, which helps to promote the normal development of e-commerce information transactions. In addition, since the recommended product information can meet the actual needs and expectations of users, users are thus able to complete transactions solely on the basis of information recommended by the e-commerce transaction platform and do not have to repeatedly look up the needed product information. This reduces the visit stress on e-commerce platforms which is caused by repeatedly looking up product information. In addition, because the optimization by the present application has eliminated large quantities of "counterfeit data" from user behavior data, there is a lower volume of data used in information recommendation analysis and higher speeds at which information recommendation analysis is conducted. Recommendation information can thus be acquired more quickly.

The device 800 of the present embodiment further optionally comprises a time effect elimination module 805, for prior to analyzing user behavior-targeted content information, bestowing a time weight on the user behavior, said time weight increasing with increasing proximity to the end moment of a preset period and decreasing with increasing proximity to the beginning moment of the preset period. The elimination of time effects by this module helps increase the accuracy of analysis of user behavior data.

The preference analysis module 803 of the device 800 of the present embodiment can be constructed in many different ways. In this example, the module comprises:

a time segment dividing sub-module 8031, a preference analysis sub-module 8032, and a filtering sub-module 8033, wherein:

the time segment dividing sub-module 8031 is for dividing the processed user behavior categories and user behavior frequencies within a preset period into at least two time segments according to when the user behaviors occurred;

the preference analysis sub-module 8032 is for analyzing user behavior-targeted content information according to the user behavior categories and user behavior frequencies in each time segment and obtaining user preference data for these time segments;

a filtering sub-module 8033 is for filtering out drifting and sudden preference data according to the user preference data of each time segment so as to obtain user preference data for the entire preset period.

The device 800 of the present embodiment further optionally comprises a similarity computing sub-module 806, to select a preset quantity of other users to compose a reference user set, and then calculate the similarity of each user awaiting recommendation to each user in the reference user set, and compose a similar users set from users whose similarity exceeds a preset similarity threshold value. The preference analysis module 803 is also used to analyze the behavior of each user in the similar users set to obtain the population preference data of this similar users set. The information recommending module 804 is also used to recommend to the users awaiting recommendation content information based on the user preference data of the users awaiting recommendation and the population preference data.

The device 800 of the present embodiment further comprises a rule set-building module 807, to select a preset quantity of users to compose a rule-setting users set, invoking the preference analysis module to analyze the behavior of each user in said rule-setting users set to obtain user preference data on each user, and conducting training based on user preference data of each user to obtain a rule set, said rule set includes a combined rule set for predicting each type of user preference for content information recommendations. The preference analysis module is also for analyzing each user's user preference data obtained from the behavior of each user in the rule-setting users set, said user preference data includes the frequency distribution of the user behavior-targeted content information; the information recommending module is for matching the user preference data of the user awaiting recommendation with said rule set and recommending content information to the user awaiting recommendation based on successfully matched user preference data. The device containing the rule set creating unit 807 combines multiple preferences of users and selects the optimal recommendation scheme to carry out content information recommendations. It avoids non-selective, "total" recommendations based on all preferences which characterize traditional recommendation methods and thus improves recommendation results and effectively raises the transaction success rate.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A content recommendation system, comprising:
one or more computer processors to:
determine a plurality of user behavior categories pertaining to a plurality of user behaviors within a preset time period, and a plurality of user behavior frequencies corresponding to the plurality of user behavior categories;
determine, based at least on the user behavior categories and corresponding user behavior frequencies, user preference data comprising frequency distribution information of a plurality of pieces of content information targeted by user behaviors in the user behavior categories;
divide the preset time period into a plurality of time segments;
analyze content information targeted by user behaviors in each time segment to determine user preference data for each time segment;
determine whether a drifting user preference, a sudden user preference, or a combination thereof exists based on the analyzed content information;
in the event that the drifting user preference exists, remove the drifting user preference from the content information;
in the event that the sudden user preference exists, remove the sudden user preference from the content information;
recommend content information to a user based at least in part on the user preference data, wherein the user is a target user;
identify a plurality of similar users who are similar to the target user, comprising to:
determine whether a geographical region corresponding to a current Internet Protocol (IP) address of the target user matches a registered geographical region of the target user;
in the event that the geographical region corresponding to the current IP address of the target user matches the registered geographical region of the target user, select a reference user set among other users with the same registered geographical region as the registered geographical region of the target user;
in the event that the geographical region corresponding to the current IP address of the target user does not match the registered geographical region of the target user, select a reference user set among other users with the same registered geographical region as the geographical region corresponding to the IP address of the target user; and
identify the plurality of similar users by comparing the target user with users in the reference user set;
obtain user behavior categories and corresponding user behavior frequencies of the plurality of similar users;
determine, based on the user behavior categories and corresponding user behavior frequencies of the plurality of similar users, population preference data comprising frequency distribution of a plurality of pieces of content information targeted by user behaviors of the plurality of similar users; and
recommend content information to the target user based at least in part on the population preference data and one or more memories coupled to the one or more processors, configured to provide the one or more processors with instructions.

2. The system of claim 1, wherein the one or more processors are further configured to:
determine whether a user behavior frequency of a user behavior category exceeds a frequency threshold; and
in the event that the user behavior frequency of the user behavior category exceeds the frequency threshold, replace the value of the user behavior frequency with the value of the frequency threshold.

3. The system of claim 1, wherein the one or more processors are further configured to:
apply time weights to user behavior data of the plurality of user behaviors; and wherein
a higher time weight is applied to more recent user behavior data than to more distant user behavior data.

4. The system of claim 3, wherein the time weights are computed according to:

$$\text{time weight}=1/\log(D_{\text{off}});$$

wherein $D_{\text{off}}$ is a time difference between a time when a user behavior occurred and an end of the preset time period.

5. The system of claim 1, wherein to determine whether the drifting user preference exists comprises to identify first content information that appears in an earlier time segment but not in a later time segment.

6. The system of claim 1, wherein to determine whether the sudden user preference exists comprises to identify second content information that is targeted with abnormally high frequency.

7. The system of claim 1, wherein:
to recommend content information to the user based at least in part on the user preference data includes to:
select a set of users to form a rule-setting users set;
analyze behaviors of users in the rule-setting users set to obtain user preference data of the rule-setting users;
perform training based on user preference data of the rule-setting users to obtain a rule set comprising one or more rules predicting content information corresponding to a type of user preference that is to be recommended given a pattern of past user preferences; and
apply the rule set to user preference data of the target user to obtain recommended content information.

8. The system of claim 7, wherein to apply the rule set to the user preference data of the target user to obtain recommended content information includes normalizing the user preference data of the target user with the user preference data of the rule-setting users.

9. A method of recommending content information to a user, comprising:
determining, using one or more computer processors, a plurality of user behavior categories pertaining to a plurality of user behaviors within a preset time period, and a plurality of user behavior frequencies corresponding to the plurality of user behavior categories;
determining, based at least on the user behavior categories and corresponding user behavior frequencies, user preference data comprising frequency distribution information of a plurality of pieces of content information targeted by user behaviors in the user behavior categories;
dividing the preset time period into a plurality of time segments;

analyzing content information targeted by user behaviors in each time segment to determine user preference data for each time segment;

determining whether a drifting user preference, a sudden user preference, or a combination thereof exists based on the analyzed content information;

in the event that the drifting user preference exists, removing the drifting user preference from the content information;

in the event that the sudden user preference exists, removing the sudden user preference from the content information;

recommending content information to the user based on the user preference data, wherein the user is a target user;

identifying a plurality of similar users who are similar to the target user, comprising:

determining whether a geographical region corresponding to a current Internet Protocol (IP) address of the target user matches a registered geographical region of the target user;

in the event that the geographical region corresponding to the current IP address of the target user matches the registered geographical region of the target user, selecting a reference user set among other users with the same registered geographical region as the registered geographical region of the target user;

in the event that the geographical region corresponding to the current IP address of the target user does not match the registered geographical region of the target user, selecting a reference user set among other users with the same registered geographical region as the geographical region corresponding to the IP address of the target user; and identifying the plurality of similar users by comparing the target user with users in the reference user set;

obtaining user behavior categories and corresponding user behavior frequencies of the plurality of similar users;

determining, based on the user behavior categories and corresponding user behavior frequencies of the plurality of similar users, population preference data comprising frequency distribution of a plurality of pieces of content information targeted by user behaviors of the plurality of similar users; and recommending content information to the target user based at least in part on the population preference data.

10. The method of claim 9, further comprising:

determining whether a user behavior frequency of a user behavior category exceeds a frequency threshold; and in the event that the user behavior frequency of the user behavior category exceeds the frequency threshold, replacing the value of the user behavior frequency with the value of the frequency threshold.

11. The method of claim 9, further comprising:

applying time weights to user behavior data of the plurality of user behaviors; and wherein a higher time weight is applied to more recent user behavior data than to more distant user behavior data.

12. The method of claim 11, wherein the time weights are computed according to:

time weight=$1/\log(D_{off})$, wherein $D_{off}$ is a time difference between a time when a user behavior occurred and an end of the preset time period.

13. The method of claim 9, wherein the determining of whether the drifting user preference exists comprises identifying first content information that appears in an earlier time segment but not in a later time segment.

14. The method of claim 9, wherein the determining of whether the sudden user preference exists comprises identifying second content information that is targeted with abnormally high frequency.

15. The method of claim 9, wherein:

recommending content information to the user based at least in part on the user preference data includes:

selecting a set of users to form a rule-setting users set;

analyzing behaviors of users in the rule-setting users set to obtain user preference data of the rule-setting users;

performing training based on user preference data of the rule-setting users to obtain a rule set comprising one or more rules predicting content information corresponding to a type of user preference that is to be recommended given a pattern of past user preferences; and applying the rule set to user preference data of the target user to obtain recommended content information.

16. The method of claim 15, wherein applying the rule set to the user preference data of the target user to obtain recommended content information includes normalizing the user preference data of the target user with the user preference data of the rule-setting users.

17. A computer program product for content recommendation, the computer program product being embodied in a non-transitory computer readable storage medium and comprising computer instructions for:

determining, using one or more computer processors, a plurality of user behavior categories pertaining to a plurality of user behaviors within a period of time, and a plurality of user behavior frequencies corresponding to the plurality of user behavior categories;

determining, based at least on the user behavior categories and corresponding user behavior frequencies, user preference data comprising frequency distribution information of a plurality of pieces of content information targeted by user behaviors in the user behavior categories;

dividing the preset time period into a plurality of time segments;

analyzing content information targeted by user behaviors in each time segment to determine user preference data for each time segment;

determining whether a drifting user preference, a sudden user preference, or a combination thereof exists based on the analyzed content information;

in the event that the drifting user preference exists, removing the drifting user preference from the content information;

in the event that the sudden user preference exists, removing the sudden user preference from the content information;

recommending content information to a user based on the user preference data, wherein the user is a target user;

identifying a plurality of similar users who are similar to the target user, comprising:

determining whether a geographical region corresponding to a current Internet Protocol (IP) address of the target user matches a registered geographical region of the target user;

in the event that the geographical region corresponding to the current IP address of the target user matches the registered geographical region of the target user, selecting a reference user set among other users with the same registered geographical region as the registered geographical region of the target user;

in the event that the geographical region corresponding to the current IP address of the target user does not match the registered geographical region of the target user, selecting a reference user set among other users with the same registered geographical region as the geographical region corresponding to the IP address of the target user; and identifying the plurality of similar users by comparing the target user with users in the reference user set;

obtaining user behavior categories and corresponding user behavior frequencies of the plurality of similar users;

determining, based on the user behavior categories and corresponding user behavior frequencies of the plurality of similar users, population preference data comprising frequency distribution of a plurality of pieces of content information targeted by user behaviors of the plurality of similar users; and recommending content information to the target user based at least in part on the population preference data.

* * * * *